United States Patent [19]

Kobashi

[11] 4,380,982
[45] Apr. 26, 1983

[54] IGNITION TIMING CONTROL METHOD

[75] Inventor: Mamoru Kobashi, Aichi, Japan

[73] Assignee: Toyota Jidosha Kabushiki Kaisha, Toyota, Japan

[21] Appl. No.: 383,308

[22] Filed: May 28, 1982

Related U.S. Application Data

[63] Continuation of Ser. No. 163,066, Jun. 26, 1980, abandoned.

[30] Foreign Application Priority Data

Jul. 2, 1979 [JP] Japan .................................. 54-82570

[51] Int. Cl.³ .......................... F02P 5/04; F02P 5/08; F02B 3/00; F02D 5/00
[52] U.S. Cl. .................................. 123/416; 123/414; 123/417
[58] Field of Search ............... 123/416, 417, 418, 406, 123/414

[56] References Cited

U.S. PATENT DOCUMENTS

| | | | |
|---|---|---|---|
| 3,853,103 | 12/1974 | Wahl et al. | 123/416 |
| 4,166,437 | 9/1979 | Bianchi et al. | 123/416 |
| 4,196,705 | 4/1980 | Hattori et al. | 123/416 |
| 4,207,847 | 6/1980 | Hattori | 123/416 |
| 4,225,925 | 9/1980 | Hattori et al. | 123/416 |
| 4,258,683 | 3/1981 | Hattori et al. | 123/416 |
| 4,262,526 | 4/1981 | Makita et al. | 123/416 |
| 4,266,518 | 5/1981 | Nishida et al. | 123/416 |

Primary Examiner—Raymond A. Nelli
Attorney, Agent, or Firm—Kenyon & Kenyon

[57] ABSTRACT

A spark advance angle corresponding to an optimum ignition timing is calculated in accordance with the operating condition of an internal combustion engine. Then, a reference crank angle position utilized for controlling the ignition timing is selectively determined in accordance with the value of the calculated spark advance angle so as to reduce any error in the ignition timing resulting from a change of the rotational speed of the engine.

5 Claims, 5 Drawing Figures

IGNITION TIMING CONTROL METHOD

This is a continuation of application Ser. No. 163,066 filed June 26, 1980 and now abandoned.

BACKGROUND OF THE INVENTION

The present invention relates to an ignition timing control method of an internal combustion engine of the spark ignition type.

When the ignition timing of an engine is to be controlled based upon a spark advancing value which is digitally calculated relying upon various signals which indicate the operating condition of the engine, for example, relying upon rotational speed signals which indicate the rotational speed of the engine, intake amount signals which indicate the amount of the air sucked into the engine, and the like, it is accepted practice to calculate, from the spark advancing value, an angle between a reference portion of and crankshaft to the position of the crank shaft corresponding to the ignition timing, or to calculate a value which corresponds to the period of time required by the crankshaft to rotate from a reference crank angle to a crank angle corresponding to the ignition timing. The value obtained by the calculation is reset, for example, in a downcounter and is counted down in response to clock signals which are produced after every crank angle increment of a predetermined size or after every time interval of a predetermined length. The operation of the count down is started from the moment at which the crankshaft reaches the position of the above-mentioned reference angle. Therefore, the moment at which the counted value of the downcounter becomes zero is recognized as an ignition timing.

Among the methods of controlling the ignition timing of this type, the method which counts down at fixed time intervals controls the ignition timing irrespective of the operation conditions of the engine, particularly irrespective of the rotational speed of the engine, after the calculation operation has finished and the downcounter has started the counting operation. Therefore, if the rotational speed of the engine is quickly changed during this period, the ignition timing no longer responds to the change in the rotational speed.

SUMMARY OF THE INVENTION

It is, therefore, an object of the present invention to provide an ignition timing control method capable of enhancing the response for controlling the ignition timing relative to change in the rotational speed of an internal combustion engine.

According to the present invention, an ignition timing control method for an internal combustion engine, comprises the steps of: generating at least one electrical signal which indicates the operating condition of the engine; calculating, in accordance with the generated electrical signal, a spark advance angle which represents an optimum ignition timing at the operating condition of the engine; selectively determining a reference crank angle position in accordance with the calculated spark advance angle; calculating an ignition control value which represents a period of time required by the crankshaft to rotate from the determined reference crank angle position to a crank angle position corresponding to the calculated spark advance angle; and controlling the timing of the sparks applied to the engine in accordance with the ignition control value and with the determined reference crank angle position.

The above and other related objects and features of the present invention will be apparent from the following description of the present invention with reference to the accompanying drawings and also from the appended claims.

DETAILED DESCRIPTION OF THE PREFERRED EMBODIMENT

Figure 1:
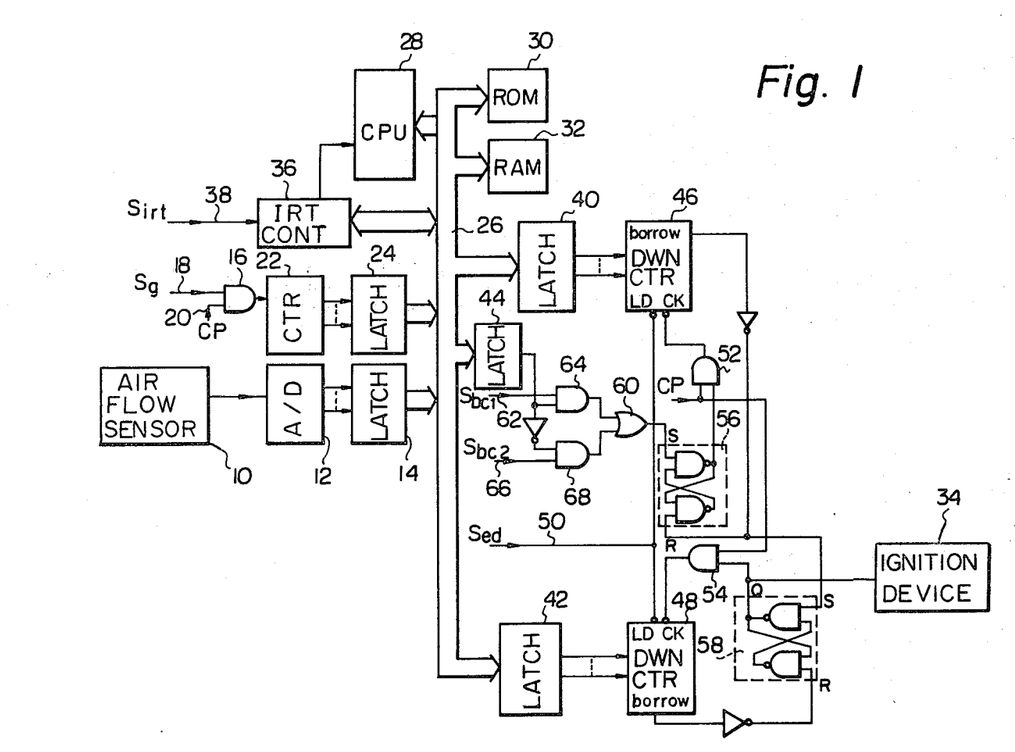
FIG. 1 is a block diagram of an ignition control system according to the present invention.

FIG. 1 is a block diagram of an ignition control system according to the present invention. The ignition control system of this embodiment is applied to spark ignition-type four-cycle internal combustion engines having six cylinders, in which explosion takes place at equal crank angles. In FIG. 1, reference numeral 10 denotes an air-flow sensor which produces analog intake-air amount signals that represent the amount of the air sucked into the engine. The intake-air amount signal produced by the air-flow sensor 10 is converted into a binary coded intake-air amount signal Q through an analog-to-digital (A/D) converter 12, and is stored in a latching circuit 14 at a predetermined timing.

An AND gate 16 is opened and closed by a gate signal Sg for detecting the rotational speed, which gate signal Sg is supplied via a line 18 from a timing signal generation circuit that will be described later. While the AND gate 16 is open, the number of clock pulses CP introduced through a line 20 is counted by a counter 22. The gate signal Sg has a duration which is equal to the time required by a crankshaft (not illustrated) of the engine to turn by a predetermined angle, i.e., equal to the time required by the crankshaft to turn by 60° (indicated as 60° CA) in this embodiment, and the clock pulse CP has a predetermined period of, for example, 12.5 microseconds in this embodiment. Therefore, the counted value of the counter 22 is in inverse proportion to the rotational speed of the engine Ne. This signal, 1/Ne, is stored in a latching circuit 24 at a predetermined timing.

The latching circuits 14 and 24 are connected to a central processing unit (CPU) 28, to a read only memory (ROM) 30 and to a random access memory (RAM) 32 via a data and address bus 26. The CPU 28 calculates the spark advance angle in accordance with a program which has been stored in the ROM 30, calculates the angle for permitting the current to flow (which represents a timing for permiting the current to flow) into an ignition coil (not illustrated) in an ignition device 34, and further produces an output value related to the ignition timing and an output value related to the timing for permitting the current to flow based upon the above-calculated results.

Upon receipt of an interrupt timing signal Sirt from the above-mentioned timing signal generation circuit via a line 38, an interrupt control circuit 36 demands an interrupt processing for the CPU 28, so that the above-mentioned calculations are initiated.

To the bus 26 are further connected a latching circuit 40 which receives the output value signal related to the ignition timing from the CPU 28, a latching circuit 42 which receives the output value signal related to the timing for permitting the current to flow from the CPU 28, and a latching circuit 44 which receives a selection signal from the CPU 28 to select the position of a reference crank angle. Preset terminals of presettable downcounters 46, 48 are connected to the latching circuits 40, 42, respectively. When a load timing signal Sld is introduced through a line 50, the output signals stored in the latching circuits 40, 42 are preset to the counters 46, 48. The counters 46, 48 perform the counting operation relying upon clock pulses CP of a predetermined period (12.5 microseconds) that are introduced through AND gates 52, 54, respectively. The opening and closing operations of the AND gates 52, 54 are controlled by the outputs Q of S-R flip-flops 56 and 58. The flip-flop 56 is set by a reference crank angle position signal Sbc1 or Sbc2 which is supplied from the above-mentioned timing signal generation circuit via an OR gate 60, and via either a line 62 and an AND gate 64 or a line 66 and an AND gate 68. The opening and closing operation of the AND gate 64 or 68 is controlled by the selection signal from the latching circuit 44. The flip-flop 56 is reset and the flip-flop 58 is set by a borrow output which is produced when the value of the downcounter 46 has reached zero. Further, the flip-flop 58 is reset by the borrow output which is generated when the value of the downcounter 48 has reached zero.

The output terminal Q of the flip-flop 58 has been connected to the input terminal of the ignition device 34. Although not illustrated, the ignition device 34 consists of an ignition coil, spark plugs of each of the cylinders connected to the secondary winding of the ignition coil via a distributor, and a switching circuit for permitting and interrupting the primary current of the ignition coil, depending upon the level of the output Q of the flip-flop 58, in a customary manner.

Figure 2:
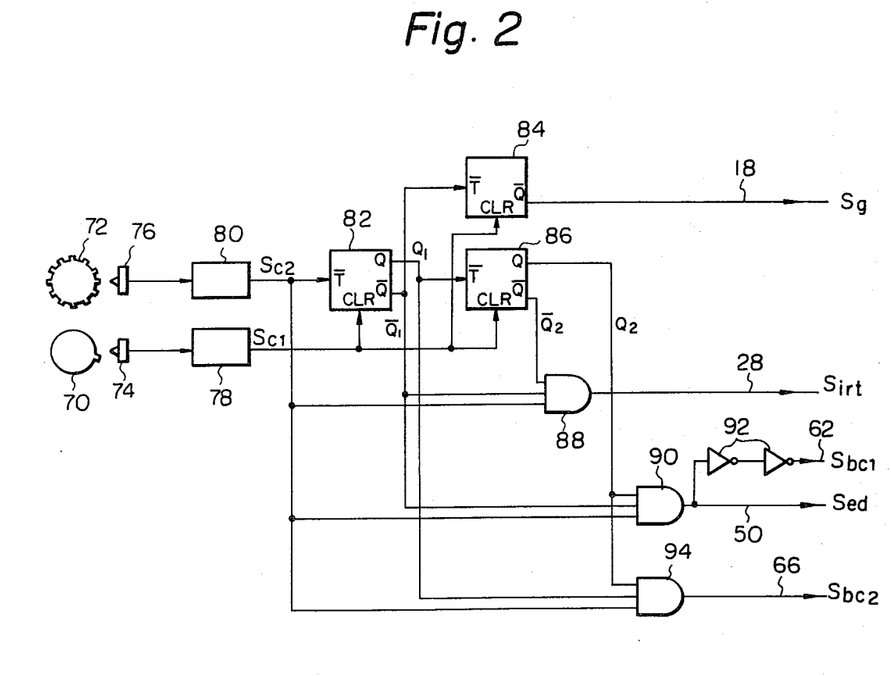
FIG. 2 is a block diagram of a timing signal generation circuit according to the present invention.
Figure 3:
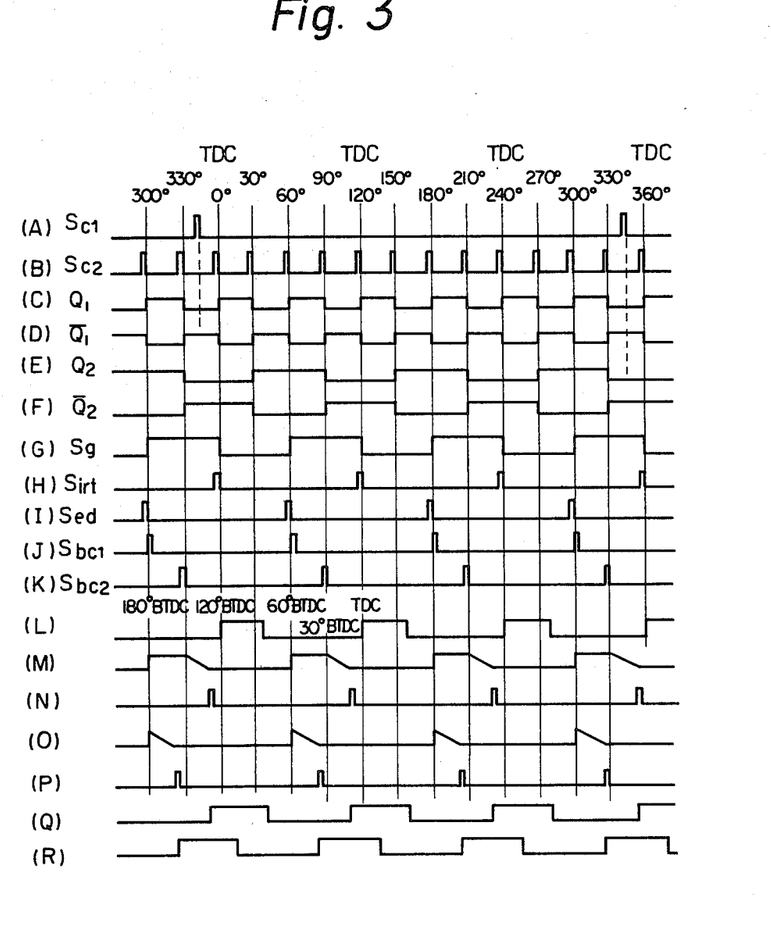
FIG. 3 illustrates wave forms of signals at each of the portions of circuits in FIGS. 1 and 2.

FIG. 2 is a block diagram illustrating an example of the aforementioned timing signal generation circuit, in which reference numerals 70 and 72 denote magnetic discs which rotate simultaneously with the crankshaft (not illustrated) of the engine. A single projection is provided on the circumference of the disc 70. As the projection passes by a magnetic pick-up sensor 74, a pulse is produced for every turn of the crankshaft, i.e., for every rank angle of 360°. A plurality of projections are formed along the circumference of the disc 72 at equal angles of 30°. As the projections pass by a magnetic pick-up sensor 76, a pulse is produced every after a crank angle increment of 30°. Wave forms of pulses from the sensors 74, 76 are shaped by wave form shaping circuits 78, 80, and are converted into crank angle position signals $Sc_1$, $Sc_2$ as illustrated by rows (A) and (B) of FIG. 3. FIG. 3 illustrates wave forms of signals at each of the portions of the circuits of FIGS. 1 and 2, wherein the abscissa represents crank angles of a given cylinder among the cylinders the top dead center in the compression stroke is set to zero. The following description is based upon the above-mentioned crank angles. In FIG. 3, the symbol TDC denotes the top dead center in the compression stroke of each of the cylinders.

In FIG. 2, reference numerals 82, 84 and 86 denote trigger-type flip-flops which will be triggered by a negative edge of a signal which is applied to a trigger input terminal $\overline{T}$ to invert their own outputs Q and $\overline{Q}$. When a signal is applied to a clear terminal CLR, the trigger-type flip-flops set the outputs Q and $\overline{Q}$ to a low level and to a high level, respectively. When the crank angle position signal $Sc_1$ illustrated in row (A) of FIG. 3 is applied to the clear terminals CLR of the flip-flops 82, 84 and 86, an initial condition is synchronized with the crank angle position of 0°. When the crank angle position signal $Sc_2$ illustrated in row (B) of FIG. 3 is applied to the flip-flop 82, the outputs $Q_1$, $\overline{Q}_1$ assume wave forms as illustrated in the rows (C) and (D) in FIG. 3. When the output $Q_1$ is applied to the flip-flop 86, the outputs $Q_2$, $\overline{Q}_2$ assume wave forms as illustrated in the rows (E) and (F) of FIG. 3. When the output $\overline{Q}_1$ of the flip-flop 82 is applied to the flip-flop 84, the output $\overline{Q}$ of the flip-flop 84, that is, the gate signal Sg, maintains a high level state only during the periods corresponding to crank angles of 60° to 120°, 180° to 240°, and 300° to 360°, as illustrated in row (G) of FIG. 3. The output $\overline{Q}_1$ of the flip-flop 82, the output $\overline{Q}_2$ of the flip-flop 86, and the crank angle position signals $Sc_2$ are fed to an AND gate 88, whereby its output, i.e., the interrupt timing signal Sirt, assumes the form of a pulse which exhibits a negative edge at each of the crank angle positions 0°, 120° and 240°, as illustrated in row (H) of FIG. 3. Since the output $\overline{Q}_1$ of the flip-flop 82, the output $Q_2$ of the flip-flop 86 and the crank angle position signal $Sc_2$ are fed to an AND gate 90, a load timing signal Sld which is the output of the AND gate 90 assumes the form of a pulse which exhibits a negative edge at each of the crank angle positions 60°, 180° and 300°, as illustrated in row (I) of FIG. 3. After having passed through delay elements 92, the load timing signal sld serves as a reference crank angle position signal $Sbc_1$ having a negative edge which slightly lags behind the above-mentioned timing (refer to row (J) of FIG. 3). The output of the flip-flop 82, the output of the flip-flop 86 and the crank angle position signal $Sc_2$ are fed to an AND gate 94, whereby the reference crank angle position signal $Sbc_2$, which is an output of the AND gate 94, assumes the form of a pulse having a negative edge at crank angle positions of 90°, 210° and 330°, which lag behind by about 30° the reference crank angle position signals $Sbc_1$, as illustrated in row (K) of FIG. 3.

The operation of the circuit of FIG. 1 is illustrated below. The demand for interrupt occurs when an interrupt timing signal Sirt is fed to the interrupt control circuit 36 at each of the crank angle positions 0°, 120° and 240°, as mentioned earlier, and the CPU 28 executes the interrupt operation. Row (L) of FIG. 3 illustrates periods for executing the interrupt operation by the CPU 28.

Figure 4:
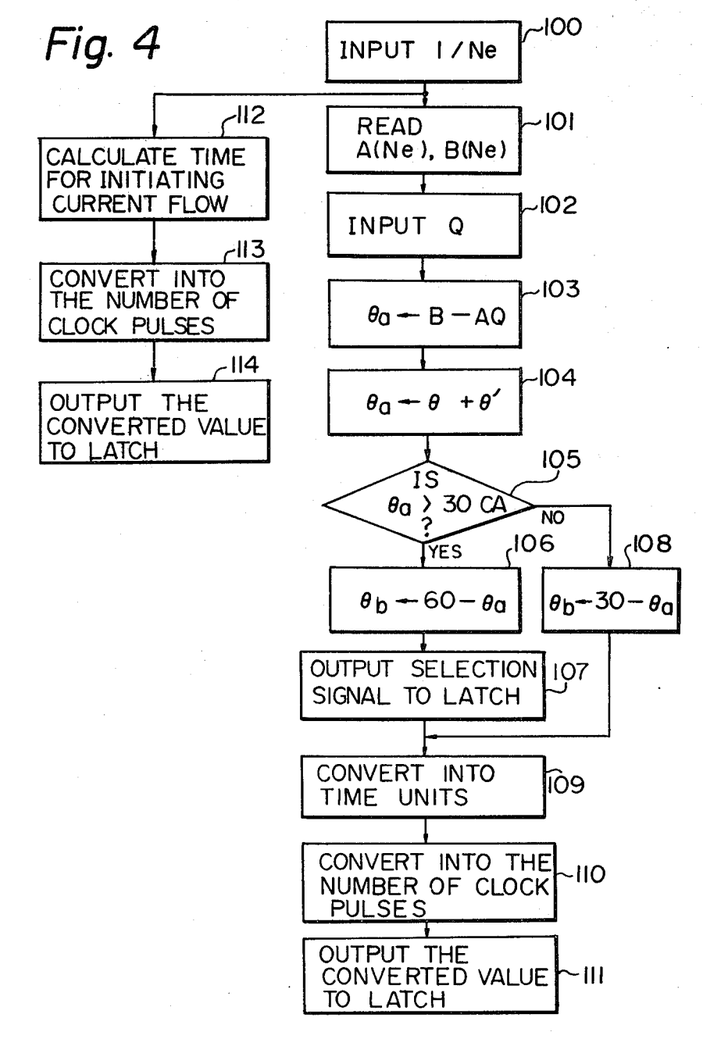
FIG. 4 is a flow chart of a program for performing arithmetic operations with respect to the ignition control.
Figure 5:
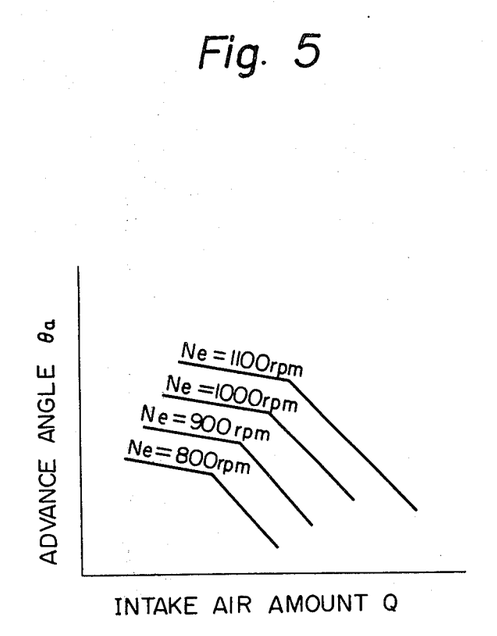
FIG. 5 illustrates the relationship among the spark advance angle $\theta_a$, the intake air amount Q and the rotational speed Ne.

FIG. 4 is a flow chart for executing the interrupt operation by the CPU 28. When it is requested to execute the interrupt, the CPU 28 introduces from the latching circuit 24 a speed signal 1/Ne which is inversely proportional to the rotational speed of the engine, at a point 100. Then, CPU 28 reads, at a point 101, the constants A and B which have been stored beforehand in the ROM 30, relying upon the data 1/Ne related to the rotational speed. Namely, in the ROM 30, coefficients A and B are stored as the gradient and intercept of an algebraic formula which represents a relationship between an optimum spark advance angle $\theta_a$ and the amount Q of the intake air, for each of the rotational speeds of the engine. In the above-mentioned case, a relationship between the amount Q of the intake air and the spark advance angle $\theta_a$ is represented by a linear formula, requiring only two coefficients. When the relationship of Q-$\theta_a$ is represented by two linear formulas for each of the rotational speeds, as illustrated in FIG. 5, however, at least five coefficients must be stored in the ROM 30 for each of the rotational speeds.

At a point 102, the signal Q related to the amount of the intake air is introduced from the latching circuit 14. At a point 103, the calculation of the spark advance angle $\theta_a$ is carried out according to a relation $\theta_a = B - AQ$, and at a point 104, the advance angle is corrected according to a relation $\theta_a = \theta_a + \theta'$. The above correction of the advance angle is customarily effected when the exhaust gas is to be recycled or when compensation for high altitude operation is performed. At a point 105, it is determined whether or not the calculated spark advance angle $\theta_a$ is greater than 30°. When $\theta_a > 30°$ CA, the desired reference crank angle position is ahead of the top dead center in the compression stroke of the cylinder that is to be ignited by a crank angle of 60°, i.e., the reference crank angle position is at 60° CA·BTDC. At a point 106, CPU 28 calculates a crank angle $\theta_b$ between the reference crank angle position and the ignition timing. In other words, at the point 106, CPU 28 performs the arithmetic operation according to $\theta_b = 60 - \theta_a$. At a point 107, CPU 28 delivers a high level selection signal to the latching circuit 44, to open the AND gate 64 and to close the AND gate 68. In this case, therefore, the reference crank angle position signal appears at crank angle positions of 60°, 180° and 300° in FIG. 3. In other words, the reference crank angle position signal Sbc$_1$ is employed, which appears at 60° CA·BTDC of a cylinder that is to be ignited.

At the point 105, if it is determined that $\theta_a \leq 30°$ CA, a 30° CA·BTDC is employed as the reference crank angle position. Then at a point 108, CPU 28 calculates a crank angle $\theta_b$ between the reference crank angle position and an ignition timing according to $\theta_b = 30 - \theta_a$. In this case, since the latching circuit 44 is not served with the selection signal of the high level state, the AND gate 64 remains closed and the AND gate 68 remains opened. Therefore, the reference crank angle position signals appear at crank angle positions of 90°, 210° and 330° in FIG. 3. In other words, reference crank angle position signals Sbc$_2$ which appear at 30° CA·BTDC of a cylinder that is to be ignited, are employed.

Thereafter, at a point 109, CPU 28 converts the calculated crank angles $\theta_b$ into time units. The conversion processing is to calculate a time T$_b$ required by the crankshaft to rotate through an angle $\theta_b$; the time T$_b$ can be easily obtained by multiplying the crank angle $\theta_b$ by the speed data 1/Ne. At a point 110, CPU 28 converts the time T$_b$ into a number of clock pulses that should be counted by the counter 46, and point 111 outputs the number of the clock pulses, that is the data related to the ignition timing, to the latching circuit 40.

The CPU 28, at a point 112, calculates the period of time between the ignition timing of the present cylinder and a time for initiating the flow of current into the primary winding of the ignition coil in order to supply spark energy applied to the next cylinder, by a well-known method. Then, CPU 28 converts, at a point 113, the calculated time period into the number of clock pulses which should be counted by the counter 48, and, at a point 114, outputs the converted number of the clock pulses, i.e., the value related to the time for permitting the flow of primary current, to the latching circuit 42.

Described below is a cylinder in which the top dead enter in the compression stroke takes place at a crank angle of 120°, as illustrated in FIG. 3. When an interrupt timing signal Sirt is produced at 120° CA·BTDC as illustrated in row (H) of FIG. 3, the CPU 28 commences the above-mentioned arithmetic operation starting from 120° CA·BTDC, as illustrated in row (L) of FIG. 3. In this case, the speed signal data applied to the CPU 28 are data which are detected by gate signals of 180° to 120° CA·BTDC. At 60° CA·BTDC, since a load timing signal Sld is fed to the downcounters 46 and 48, the contents of the latching circuits 40 and 42 are set to the counters 46 and 48, respectively. When the spark advance angle $\theta_a$ calculated by the CPU 28 is greater than 30° CA, the reference crank angle position signal Sbc$_1$ appears at a position which is approximately 60° CA·BTDC (refer to row (J) of FIG. 3), although it slightly lags behind the load timing signal Sld, whereby the flip-flop 56 is set to initiate the counting operation of the downcounter 46. Row (O) of FIG. 3 illustrates the content of the downcounter 46. After having counted a preset value related to the ignition timing, the downcounter 46 produces a borrow output, and its inverted output illustrated in row (P) of FIG. 3) causes the flip-flop 58 to be set, and also causes the flip-flop 56 to be reset. When the flip-flop 58 is set, the downcounter 48 commences the counting operation. After having counted the preset value related to the timing for initiating the flow of primary current, the counter 48 produces a borrow output which causes the flip-flop 58 to be reset. Therefore, the flip-flop 58 produces the output Q, as illustrated in row (R) of FIG. 3. The ignition device 34 so controls the output Q that its positive edge corresponds to an ignition timing of a cylinder that is to be ignited this time, and the negative edge corresponds to a timing for permitting the current to flow into the ignition coil so that the next cylinder will be ignited.

When the spark advance angle $\theta_a$ calculated by the CPU 28 is equal to or smaller than 30° CA, on the other hand, a reference crank angle position signal Sbc$_2$ (refer to row (K) of FIG. 3) of 30° CA·BTDC is used. Therefore, the downcounter 46 commences the counting operation starting from 30° CA·BTDC, as illustrated in row (M) of FIG. 3. In FIG. 3, row (N) illustrates inverted outputs of the borrow outputs of the counter 46, and the diagram (Q) illustrates the output Q of the flip-flop 58.

According to the embodiment of the present invention as mentioned above, the reference crank angle position which corresponds to the moment for initiating the counting operation of the counter 46 can be selectively changed to 60° CA·BTDC or to 30° CA·BTDC, depending upon whether the calculated spark advance angle $\theta_a$ is greater or less than 30° CA. Therefore, the counting time of the counter 46 is reduced, and the deviation in the ignition timing can be minimized, even when the rotational speed of the engine is rapidly changed during the counting time.

Although the above-mentioned embodiment selects either one of the two reference crank angle positions, the method of the present invention is in no way limited thereto; two or more reference angle positions may be provided, and any one of them may be selected. The deviation in the ignition timing caused by the change of the rotational speed can be decreased with the decrease in the distance between the reference crank angle positions.

In the above-mentioned embodiment, furthermore, the pulse width (duration) of the gate signals Sg for detecting the rotational speed has a relatively broad angular width of 60° CA, in order to prevent the change in the rotational speed accompanying the combustion cycle of the engine from appearing on the speed data 1/Ne, as well as to restrain variance in the ignition timing under steady-state operation conditions.

According to the method of the present invention, as illustrated in detail in the foregoing, the reference crank angle position is selectively changed depending upon the calculated spark advance angle, so that error in the ignition timing can be minimized relative to the change in the rotational speed. In other words, the response for controlling the ignition timing can be enhanced relative to the change in the rotational speed.

As many widely different embodiments of the present invention may be constructed without departing from the spirit and scope of the present invention, it should be understood that the present invention is not limited to the specific embodiments described in this specification, except as defined in the appended claims.

What is claimed is:

1. An ignition timing control method for an internal combustion engine having at least one cylinder and a crankshaft, comprising the steps of:
   detecting a parameter which affects the ignition timing of the operating engine;
   generating at least one electrical signal which indicates the value of the detected parameter; and
   calculating, in response to said generated electrical signal, a spark advance angle which represents an optimum ignition timing at the value of said detected parameter, wherein the improvement comprises:
   selecting one reference crank angle position from a plurality of different reference crank angle positions for each cylinder, said selected reference crank angle position depending on the value of said calculated spark advance angle;
   calculating the difference angle between said selected reference crank angle position and the crank angle position corresponding to the calculated spark advance angle;
   sensing when the crankshaft rotates through the selected reference crank angle position;
   calculating an ignition control value which represents a period of time required by the crankshaft to rotate through said calculated difference angle; and
   producing an ignition spark in response to said ignition control value when said period of time has elapsed after the crankshaft rotates past said sensed selected reference crank angle position.

2. An ignition timing control method as claimed in claim 1, wherein said step of selecting one of a plurality of reference crank angle positions includes the steps of:
   comparing said calculated spark advance angle with at least one predetermined value, and
   selecting a reference crank angle position in accordance with the result of said comparison.

3. An ignition timing control method as claimed in claim 1, wherein said step of selecting one of a plurality of reference crank angle positions includes a step of selecting a first crank angle position or a second crank angle position which is advanced greater than said first crank angle position, depending upon whether or not the crank angle position corresponding to said calculated spark advance angle is advanced greater than said first crank angle position.

4. An ignition timing control method as claimed in claim 1, 2 or 3, wherein said step of generating at least one electrical signal which indicates the detected operating condition of the engine includes a step of generating first electrical signals which represent the amount of air sucked into the engine and second electrical signals which represent the rotational speed of the engine.

5. An ignition timing control method as claimed in claim 4, wherein said step of calculating a spark advance angle is performed by a digital computer programmed to calculate said angle from predetermined functions describing a desired relationship among the amount of air sucked into the engine, the rotational speed of the engine, and the optimum spark advance angle.

* * * * *

UNITED STATES PATENT AND TRADEMARK OFFICE
CERTIFICATE OF CORRECTION

PATENT NO. : 4,380,982
DATED : April 26, 1983
INVENTOR(S) : Mamoru Kobashi

It is certified that error appears in the above—identified patent and that said Letters Patent is hereby corrected as shown below:

On the title page,

Change the Name of the Assignee from:

"Toyota Jidosha Kabushiki Kaisha" to

--Toyota Jidosha Kogyo Kabushiki Kaisha--.

Signed and Sealed this

Fifteenth Day of November 1983

[SEAL]

Attest:

GERALD J. MOSSINGHOFF

Attesting Officer   Commissioner of Patents and Trademarks